United States Patent
Gish et al.

(10) Patent No.: US 9,060,180 B2
(45) Date of Patent: Jun. 16, 2015

(54) DRIFT-FREE, BACKWARDS COMPATIBLE, LAYERED VDR CODING

(75) Inventors: Walter C. Gish, Oak Park, CA (US); Samir Hulyalkar, Los Gatos, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 555 days.

(21) Appl. No.: 13/478,695

(22) Filed: May 23, 2012

(65) Prior Publication Data

US 2012/0314773 A1    Dec. 13, 2012

Related U.S. Application Data

(60) Provisional application No. 61/495,833, filed on Jun. 10, 2011.

(51) Int. Cl.
*H04N 19/61* (2014.01)
*H04N 19/30* (2014.01)

(52) U.S. Cl.
CPC .............. *H04N 19/61* (2014.11); *H04N 19/30* (2014.11)

(58) Field of Classification Search
CPC .................................. H04N 7/30; H04N 7/50
USPC ...................................................... 375/240.01
See application file for complete search history.

(56) References Cited

U.S. PATENT DOCUMENTS

| | | | | |
|---|---|---|---|---|
| 7,450,613 B2 * | 11/2008 | Choi et al. | ..................... | 370/486 |
| 7,725,799 B2 * | 5/2010 | Walker et al. | ................. | 714/755 |
| 8,711,948 B2 * | 4/2014 | Tu et al. | ..................... | 375/240.26 |
| 8,737,470 B2 * | 5/2014 | Walker et al. | ............. | 375/240.12 |
| 8,767,004 B2 * | 7/2014 | Longhurst | ..................... | 345/590 |
| 2004/0090997 A1 * | 5/2004 | Choi et al. | ..................... | 370/535 |
| 2006/0197828 A1 * | 9/2006 | Zeng et al. | ................. | 348/14.13 |
| 2006/0198454 A1 * | 9/2006 | Chung et al. | ................... | 375/260 |
| 2006/0232447 A1 * | 10/2006 | Walker et al. | ................... | 341/50 |

(Continued)

FOREIGN PATENT DOCUMENTS

WO    2012/027405    3/2012

OTHER PUBLICATIONS

Liu, S., et al. "Bit-Depth Scalable Coding for High Dynamic Range Video" Proc. of SPIE-IS&T Electronic Imaging, SPIE vol. 6822, 2008.

(Continued)

*Primary Examiner* — Dave Czekaj
*Assistant Examiner* — Kehinde O Abimbola
(74) *Attorney, Agent, or Firm* — Steinfl & Bruno LLP

(57) ABSTRACT

A visual dynamic range (VDR) signal and a standard dynamic range (SDR) signal are received. A first (e.g., MPEG-2) encoder encodes a base layer (BL) signal. A second encoder encodes an enhancement layer (EL). The EL signal represents information with which the VDR signal may be reconstructed, e.g., using the BL and the EL signals. The first encoder encodes the SDR signal with inverse discrete cosine transform (IDCT) coefficients that have a fixed precision, e.g., which represent fixed-point approximations of transform coefficients that may have arbitrary precisions. The BL signal is encoded in a stream that conforms with an Advanced Television Standards Committee (ATSC) standard. The EL is encoded in a stream that conforms with an ATSC enhanced vestigial sideband (E-VSB) standard. The BL and EL signals are combined; e.g., multiplexed, and transmitted together.

23 Claims, 6 Drawing Sheets

(56) References Cited

U.S. PATENT DOCUMENTS

| | | | |
|---|---|---|---|
| 2008/0063089 A1* | 3/2008 | Chen | 375/240.26 |
| 2009/0238279 A1* | 9/2009 | Tu et al. | 375/240.16 |
| 2011/0194618 A1 | 8/2011 | Gish | |
| 2011/0298981 A1* | 12/2011 | Eyer | 348/563 |
| 2012/0092453 A1* | 4/2012 | Suh | 348/43 |
| 2012/0229495 A1* | 9/2012 | Longhurst | 345/590 |

OTHER PUBLICATIONS

Gao, Y., et al. "H.264/Advanced Video Coding (AVC) Backward-Compatible Bit-Depth Scalable Coding" IEEE Transactions on Circuits and Systems for Video Technology, vol. 19, No. 4, Apr. 2009, pp. 500-510.

ATSC Standard: Video System Characteristics of AVC in the ATSC Digital Television System, Document A/72 Part 1, Jul. 29, 2008.

Zhang, Ci-Xun, et al. "Systematic Approach of Fixed Point 8×8 IDCT and DCT Design and Implementation" Beijing, published on Dec. 1, 2006.

ATSC Recommended Practice: E-VSB Implementation Guidelines, Apr. 18, 2006.

ATSC Standard: Program and System Information Protocol for Terrestrial Broadcast and Cable, Apr. 14, 2009.

ATSC Digital Television Standard: Part 3-Service Multiplex and Transport System, Aug. 7, 2009, Document A/53 part 3.

* cited by examiner

| Major Number | Minor Number | Short Name | Channel TSID | Program Num. | Hidden flag | Descriptor |
|---|---|---|---|---|---|---|
| 12 | 1 | FXX.D | 0x0AA1 | 0x00F1 | 0 | Ch. name |
| 12 | 2 | FXX.E | 0x0AA1 | 0x00F2 | 1 | Ch. name |
| 12 | 3 | FXX.S | 0x0AA1 | 0x00F3 | 0 | Ch. name |

FIG. 5

DRIFT-FREE, BACKWARDS COMPATIBLE, LAYERED VDR CODING

CROSS REFERENCE TO RELATED APPLICATIONS

This application claims the benefit of priority to related, Provisional U.S. Patent Application No. 61/495,833 filed on 10 Jun. 2011 entitled "Drift-Free, Backwards Compatible, Layered VDR Coding" by Walter Gish, et al. hereby incorporated by reference in its entirety.

TECHNOLOGY

The present invention relates generally to images. More particularly, an embodiment of the present invention relates to drift-free, backwards compatible, layered coding of high dynamic range images.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or opthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate either a VDR version or an SDR version of the content, which may be displayed on VDR displays or conventional SDR displays. In one approach, generating the SDR version from the generated VDR version may involve applying a tone mapping operator (TMO) to intensity (e.g., luminance, luma) related pixel values in the HDR content. In a second approach, as described in PCT application PCT/US2011/048861 "Extending Image Dynamic Range", filed 23 Aug. 2011, by W. Gish et al., herein incorporated by reference for all purposes, generating an SDR image may involve applying an invertible operator (or predictor) on the VDR data. To conserve bandwidth or for other considerations, transmission of the actual captured VDR content may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to generated VDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the VDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays.

Under existing VDR layered coding techniques, drift may occur between an encoder and a decoder due to mismatches in computing transform-related operations. Furthermore, existing video transmission standards for the transmission of digital television, such as the Advanced Television Standards Committee (ATSC) standards being used in North America, do not specify methods for backwards-compatible transmission of VDR signals to legacy ATSC receivers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 5 depicts an example ATSC VCT Table according to an embodiment of the present invention;

DESCRIPTION OF EXAMPLE EMBODIMENTS

Encoding visual dynamic range signals is described. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the layered coding of images with a heightened dynamic range, such as visual dynamic range (VDR) images. An embodiment applies fixed-precision transform coding to an MPEG encoder of the base layer in layered VDR coding. This allows drift-free, backwards compatible coding and decoding of VDR signals.

A visual dynamic range (VDR) signal and a standard dynamic range (SDR) signal are received. A first (e.g., MPEG-2) encoder encodes a base layer (BL) signal. A second encoder encodes an enhancement layer (EL). The EL signal represents information with which the VDR signal may be reconstructed, e.g., using the BL and the EL signals. The first encoder encodes the SDR signal with discrete cosine transform (DCT) and discrete inverse discrete cosine transform (IDCT) coefficients that have a fixed precision, e.g., which represent fixed-point approximations of transform coefficients that may have arbitrary precisions. The BL signal is encoded in a stream that conforms with an Advanced Television Standards Committee (ATSC) standard. The EL is encoded in a stream that conforms with the ATSC enhanced vestigial sideband (E-VSB) standard. The BL and EL signals are combined; e.g., multiplexed. The combined BL/EL signals are transmitted, e.g., together.

Given a pair of corresponding VDR and SDR images, such as images that represent the same scene, each at different levels of dynamic range, improved layered VDR coding is achieved. The VDR image is coded by combining a base layer (e.g., the SDR image) and a residual as an enhancement layer. In an embodiment, the enhancement layer comprises a difference between the original VDR image and a version thereof that is predicted, e.g., from the base layer.

Example VDR-SDR System

Figure 1:
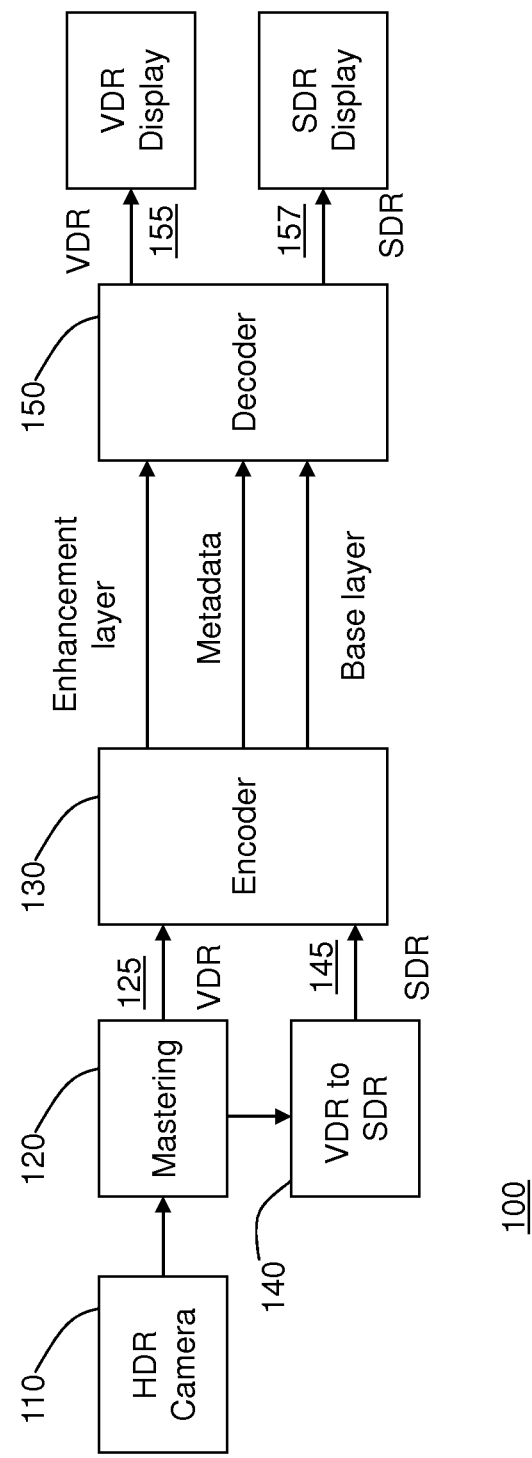
FIG. 1 depicts an example data flow for a VDR-SDR system, according to an embodiment of the present invention.

FIG. 1 depicts an example data flow in a VDR-SDR system 100, according to an embodiment of the present invention. An HDR image or video sequence is captured using HDR camera 110. Following capture, the captured image or video is processed by a mastering process to create a target VDR image 125. The mastering process may incorporate a variety of processing steps, such as: editing, primary and secondary color correction, color transformation, and noise filtering. The VDR output 125 of this process represents the director's intent on how the captured image will be displayed on a target VDR display.

The mastering process may also output a corresponding SDR image 145, representing the director's intent on how the captured image will be displayed on a legacy SDR display. The SDR output 145 may be provided directly from mastering process 120 or it may be generated by a separate VDR-to-SDR converter 140.

In an example embodiment, the VDR 125 and SDR 145 signals are input into an encoder 130. Encoder 130 creates a coded bitstream, which that reduces the bandwidth required to transmit the VDR and SDR signals. Moreover, encoder 130 functions to create a signal that allows a corresponding decoder 150 to decode and render either the SDR or VDR signal components. In an example implementation, encoder 130 may be a layered encoder, such as one of those defined by the MPEG-2 and H.264 coding standards, which represents its output as a base layer, an optional enhancement layer, and metadata. As defined herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or other predictor and quantizer operators, such as those described herein.

On the receiver, decoder 150 uses the received coded bitstreams and metadata to render either an SDR image or a VDR image, according to the capabilities of the target display. For example, a legacy SDR display may use only the base layer information to render an SDR image. In contrast, an advanced SDR display or a VDR display may use information from all input layers and the metadata to render a VDR signal.

In some approaches to transform-based, VDR layered coding, drift may sometimes occur between an encoder and a decoder. For example, drift may be caused by mismatches in the computational precision of the transform-related operations. The combined International Standards Organization (ISO)/International Electro-technical Conference (IEC) compression/decompression (codec) standard H.264, also known as MPEG-4, part 10 or as the Advanced Video Codec (AVC), specifies the inverse transform which is used during compression and decompression in terms of fixed precision integer operations during both encoding and decoding. Earlier coding standards, such as MPEG-1, MPEG-2, and MPEG-4, part 2, provide fewer restrictions on the computation of inverse DCTs.

For example, MPEG-4, part 2 (ISO/IEC 14496-2, 2d edition, 2001-12-1), in Annex A, specifies the coefficients of DCT and IDCT transforms based on generic cosine functions. MPEG-compliant encoders and decoders can compute the DCT and IDCT transforms in a variety of ways, including floating-point arithmetic or n-bit fixed point arithmetic, in which n comprises an integer of a particular number of discrete binary information quanta (bits). The integer n may comprise eight, ten, twelve bits or more (e.g., n=8, 10, 12, 14, 16 bits). Mismatches between encoding and decoding transform-related computations may have a small effect in conventional single-layered coding. However, drift issues and related errors may relate to such mismatches in layered coding approaches.

To address drift, fixed-precision transform-based codecs such as H.264 have been used to code all layers of a VDR bit stream. Some layered bitstreams that are so coded may not be backwards-compatible with existing, e.g., legacy decoders. For example, in North America, most HDTVs decode ATSC-compliant, MPEG-2 based streams. An embodiment of the present invention allows efficient, drift-free, and backwards compatible VDR layered coding and decoding.

In a backwards-compliant VDR, ATSC-like system, an embodiment reduces drift using pre-determined, fixed-precision approximations, instead of the 8×8 IDCT coefficients of the baseline MPEG-2 encoder. An embodiment may encode the enhancement layer with a fixed-precision codec, such as H.264. An embodiment combines the base layer and the enhancement layer using backwards-compatible multiplexing. An embodiment may be implemented with incorporation of hidden channels, private data, or combinations thereof, which are allowed in the ATSC standard. Legacy ATSC decoders may thus fully decode the base layer. At the same time, VDR ATSC decoders may decode both the base layer and the enhancement layer, which allows reconstruction of either standard dynamic range (SDR) images or a VDR output with no drift.

Figure 2:
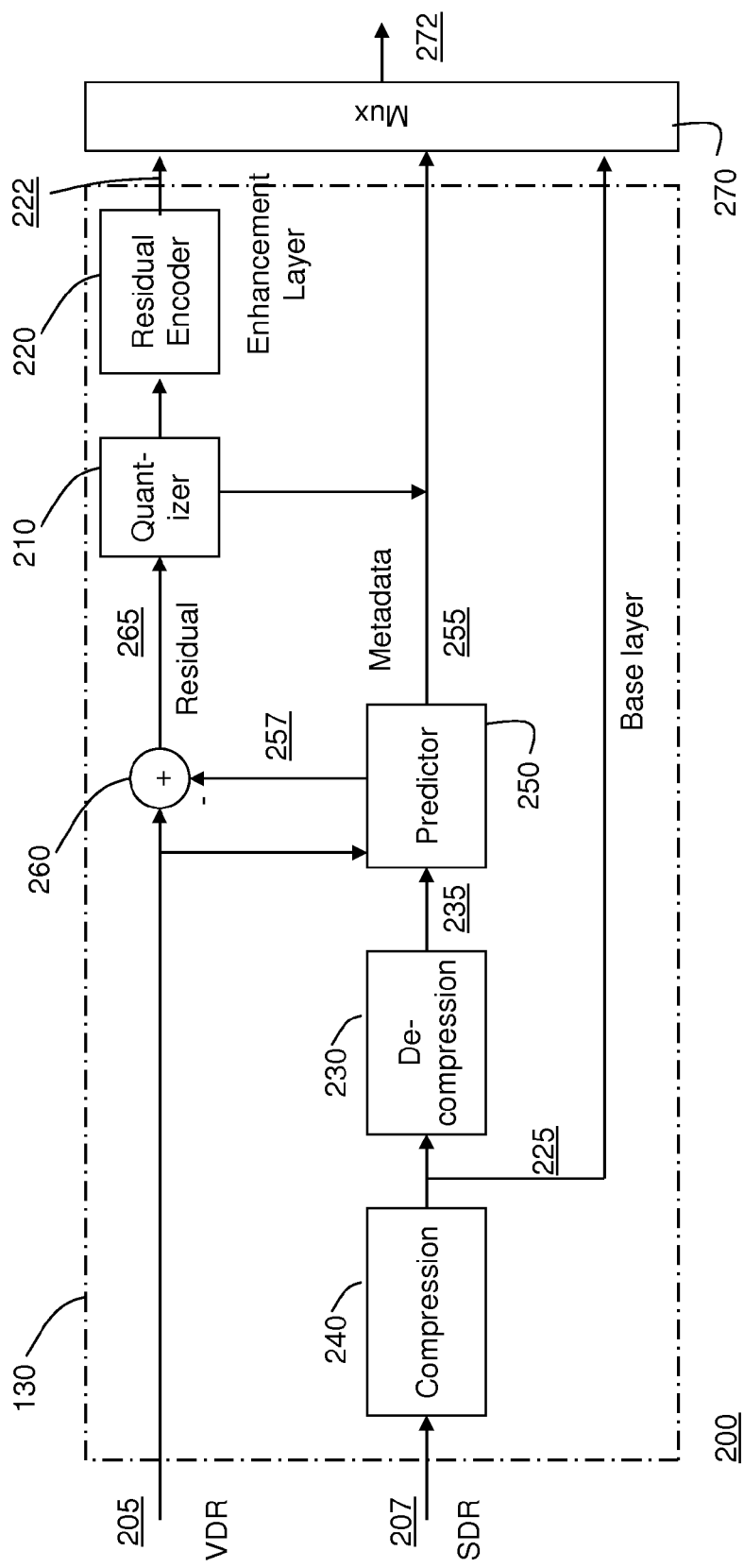
FIG. 2 depicts an example layered VDR encoding system according to an embodiment of the present invention.

FIG. 2 depicts an example implementation of encoder 130, according to an embodiment of the present invention. SDR input 207 is typically 8-bit, 4:2:0, ITU Rec. 709 data; however the methods of this embodiment apply to other SDR representations as well. For example, some implementations may use an enhanced SDR input, SDR', which may have the same color space (primaries and white point) as SDR, but may use high precision, say 12-bits per pixel, with all color components at full spatial resolution (e.g., 4:4:4 RGB). The SDR input 207 is applied to compression system 240. Depending on the application, compression system 240 can be either lossy, such as according to the H.264 or MPEG-2 standards, or lossless. The output of the compression system 240 may be transmitted as a base layer 225. To reduce drift between the encoded and decoded signals, encoder 130 may follow compression process 240 with a corresponding decompression process 230. Signal 235 represents the SDR input as it will be received by a decoder. Predictor 250, as described for example in PCT application—PCT/US2012/033605, "Multiple color channel multiple regression predictor", filed on 13 Apr. 2012, by G-M. Su et al., using input VDR 205 and SDR 235 data will create signal 257 which represents an approximation or estimate of input VDR 205. Adder 260 subtracts the predicted VDR 257 from the original VDR 205 to form output residual signal 265. Residual 265 may also be coded by another lossy or lossless encoder 220, such as those defined by the MPEG standards, and may be multiplexed in the output bit stream and transmitted to the decoder as an enhancement layer.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Residual 265 represents the difference between two VDR signals, thus it is expected to be represented by more than 8-bits per color component. In many possible implementations, encoder 220 may not be able to support the full dynamic range of this residual signal. In an example implementation, the residual may be 16 bits and the residual encoder 220 may be a standard H.264, 8-bit, encoder. In order for encoder 220 to accommodate the dynamic range of residual 265, quantizer 210 quantizes residual 265 from its original bit-depth representation (say 12 or 16 bits) to a lower bit-depth representation. The quantizer parameters may also be multiplexed into the metadata bitstream 255. In an example implementation, base layer 225, metadata 255, and enhancement layer 222 may be multiplexed together in multiplexor 270 to form a single coded bitstream 272 to be transmitted to both SDR and VDR decoders.

Figure 3:
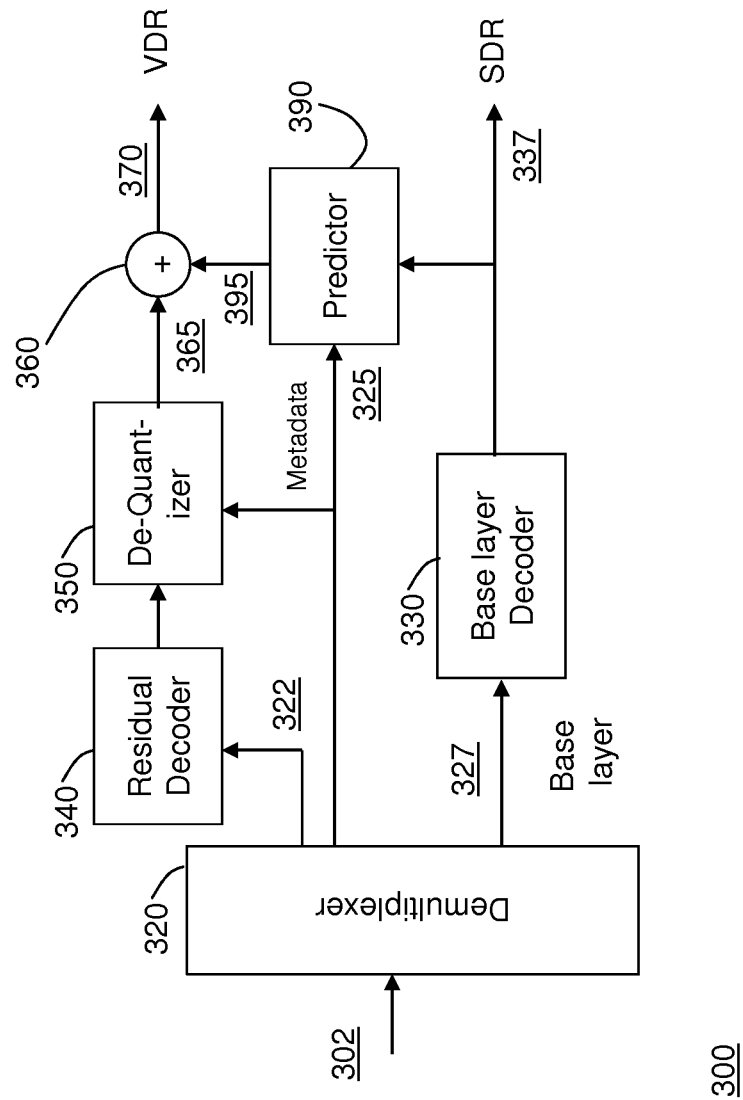
FIG. 3 depicts an example layered VDR decoding systems according to an embodiment of the present invention.

FIG. 3 depicts in more detail an example implementation of decoder 150. Decoding system 300 receives a coded bitstream 302 that comprises a base layer 327, an enhancement layer (or residual) 322, and metadata 325, which are extracted following demultiplexing 320. For example, in a VDR-SDR system, the base layer 327 may represent the SDR representation of the coded signal and the metadata 325 may include information related the prediction (250) and quantization (210) steps used in the encoder. Encoded base layer 327 is decoded using base layer decoder 330 to output decoder SDR signal 337. Encoded residual 322 is decoded (340), de-quantized (350), and added to the output 395 of the predictor 390 to generate the output VDR signal 370.

Drift-Free and Backwards-Compatible Coding

Prediction-based encoders, such as those used in the MPEG family of video coding standards, improve coding efficiency by taking advantage of the temporal dependencies among neighbor frames in a video stream. Thus, a coded bit stream is transmitted by combining information from anchor frames (such as I-frames) with their difference-related information from predicted frames (such as P or B frames). Anchor frames can be coded and decoded independently of all other frames. In contrast, predicted frames are reconstructed by adding difference-related information to prior decoded reference frames. Because of this inter-frame dependency in video decoding, decoding errors tend to propagate and accumulate, and cause drift and mismatches between the encoded and decoded frames. The potential for drift is even more prominent in layered coding, since in addition to inter-frame prediction errors one adds inter-layer prediction errors as well.

One approach to reduce drift is to define anchor frames in more frequent intervals; however, anchor frames require far more bits than predicted frames, hence this approach reduces coding efficiency. Another way to reduce drift is by forcing fixed-precision integer operations in both the encoder and the decoder. For example, in H.264, the traditional 8×8 IDCT—used in all prior MPEG standards—is replaced by a fixed-precision 4×4 or 8×8 IDCT approximation. While using H.264 or other codecs that use fixed-precision integer transforms reduces the drift problem, this solution may not be backwards compatible with a prior installed base of legacy decoders that can't be upgraded to support the newer codecs.

As used herein, the term "ATSC" denotes a set of standards developed by the Advanced Television Systems Committee for the coding and transmission of digital TV over terrestrial, cable, and satellite networks. While parts of the ATSC standards do support H.264 coding (see for example, Document A/72, Part 1, *"ATSC Standard: Video system characteristics of AVC in the ATSC Digital Television System"*, 29 Jul. 2008), the majority of deployed ATSC-compliant HDTV sets and set-top boxes can decode only MPEG-2 coded bitstreams. Thus, transmission of backwards compatible VDR signals to both legacy ATSC-compliant decoders and newer VDR decoders imposes some limitations on the coding methods that can be employed. In an embodiment, system 200 in FIG. 2 may be adapted for the ATSC-compatible transmission of a VDR signal as follows.

In FIG. 2, compression unit 240 is an ATSC, MPEG-2 compliant, encoder, and decompression unit 230 is an MPEG-2 compliant decoder. Residual encoder 220 can be an H.264 compliant encoder or any other encoder that specifies fixed-precision transform coding. Since drift may result due to the mismatch between transform-related computations in the encoder and the decoder, an example embodiment replaces the unconstrained IDCT transforms in compression units 240 and decompression units 230 with fixed-precision, integer approximations of the 8×8 IDCT, such as those described by C-X Zhang et al. in "Systematic Approach of fixed point 8×8 IDCT and DCT Design and implementation," PCS 2006, Beijing, 2006.

To further reduce drift due to rounding operations, example embodiments may also implement bit-exact implementations of the IDCT transform, wherein the term "bit-exact implementation" herein relates to not only specifying fixed-precision IDCT transform coefficients, but also specifying the order of computing the IDCT transform-related operations.

Some embodiments may specify fixed-precision or bit-exact implementations for both the DCT and IDCT transforms.

The replacement fixed-precision transform coefficients can be pre-defined in both the encoder and the decoder, or in an alternative implementation, they can be signaled from an encoder to the decoder as part of the metadata.

Considering now the corresponding VDR decoder 300 depicted in FIG. 3, where base layer decoder 330 is an ATSC (MPEG-2) decoder, and residual decoder 340 corresponds to the residual encoder 220, one may apply an identical or similar integer approximation to the IDCT coefficients in base layered decoding 330 as the one used in base layer encoding 240.

This approach allows legacy ATSC decoders to decode the base layer SDR stream while VDR decoders can decode, drift-free, either SDR or VDR streams. While using pre-defined approximations of the IDCT transform coefficients may resolve drift issues, the requirement of backwards compatibility in stream demultiplexing 320 imposes some additional constrains on how the base layer and the enhancement layered may be multiplexed. Example embodiments of ATSC-compatible VDR systems described herein may be based on E-VSB transmission, hidden channel transmission, or embedding private data.

E-VSB Transmission

Figure 4:
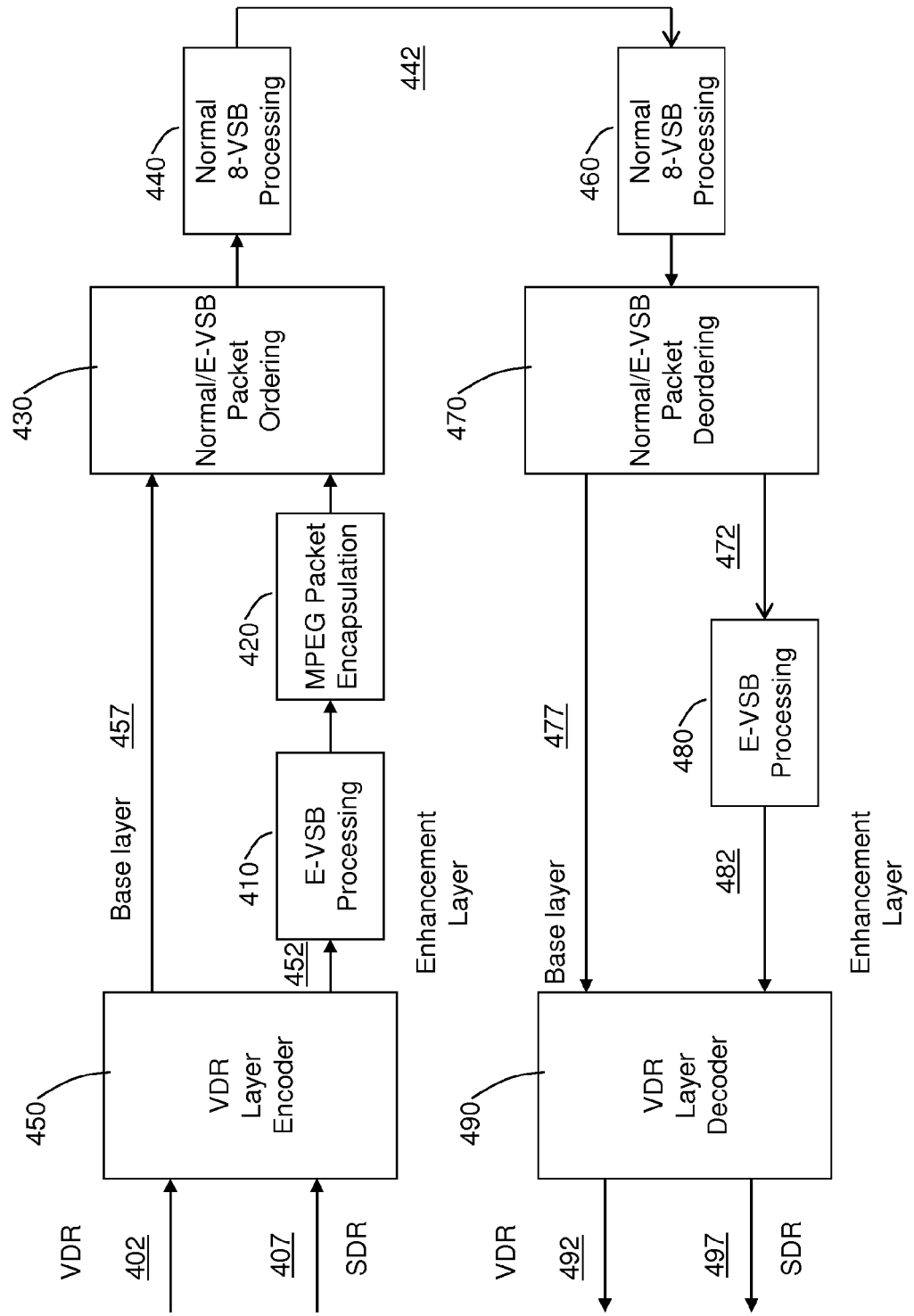
FIG. 4 depicts an example of a VDR ATSC-compatible system according to an embodiment of the present invention.

FIG. 4 depicts an example implementation of a VDR ATSC—compatible system using ATSC's enhanced E-VSB services. ATSC's E-VSB, described in "Doc. A/112, *ATSC Recommended Practice: E-VSB Implementation Guidelines*, 18 Apr. 2006," which is incorporated herein by reference, was originally developed to add enhanced error protection to a portion of the ATSC 8-VSB transmission. Older or non E-VSB-enabled receivers cannot take advantage of the E-VSB functionality; however, they can still decode the 8-VSB transmitted signal.

From FIG. 4, according to an illustrative implementation, VDR layer encoder 450 receives VDR 402 and SDR 407 inputs, generating an ATSC-compliant base layer 457 and an enhancement layer 452. VDR layer encoder 450 may be one similar to system 200 depicted in FIG. 2, wherein compression unit 240 and decompression units 230 are MPEG-2 encoders and decoders respectively, and wherein the 8×8 IDCTs are computed by pre-determined fixed-precision operations to reduce drift on a ATSC decoder using similar fixed-precision operations. As described before, residual encoder 220 can be any appropriate video encoder with pre-defined fixed-precision transforms, such as an H.264 encoder.

Base layer 457 (225) may be coded and transmitted using normal, 8-VSB, processing, while the enhancement layer 452 (222) may be transmitted as an E-VSB stream. The transmitted bit-stream 442 represents multiplexed packets from both the Normal and the E-VSB streams.

On the receiver, after normal 8-VSB decoding (460), decoder unit 470 may extract SDR base layer 477 and E-VSB data 472. A legacy ATSC decoder will ignore the E-VSB stream and decode only the SDR coded data to output SDR output 497. A VDR decoder, may decode both the SDR coded stream 477 and the enhancement data 472, and combine them to reconstruct either SDR stream 497 or VDR stream 492. In an example implementation, VDR layer decoder 490 may be similar to system 300 depicted in FIG. 3, wherein SDR decoder is an MPEG-2 decoder and the 8×8 IDCT is computed using pre-determined fixed-precision approximations of the IDCT coefficients, identical or closely similar to those used by the corresponding encoder 450.

Hidden Channel

Document A/65, "*ATSC Standard: System Information Protocol for Terrestrial Broadcast and Cable (PSIP)*, 14 Apr. 2009", herein incorporated by reference, defines the ATSC Virtual Channel Table (VCT) as a list of attributes for virtual channels carried in an ATSC-compliant Transport Stream. The basic information contained in the VCT table body comprises such information as: the Transport Stream ID, channel number (major and minor), short channel name, program number, service type, and a number of descriptors. One such descriptor is the "hidden" flag, a 1-bit Boolean flag that indicates whether a channel can be accessed by the user by direct entry of the virtual channel number. Hidden channels are skipped when the user navigates TV channels. Hidden channels are typically used for test signals and near video on demand services. An embodiment uses hidden channels for backwards compatible transmission of VDR signals.

FIG. 5 depicts an example VCT Table representing VDR transmission, according to an embodiment of the present invention. Channel 12.1 may carry the baseline, SDR signal, while hidden channel 12.2 may carry the enhancement layer corresponding to the baseline layer. Channel 12.3 may carry a secondary program, unrelated to channel 12.1. A legacy ATSC decoder may extract, decode, and playback the SDR signal defined in channel 12.1, while a VDR ATSC-like decoder can extract both the base layer and the enhancement layers in channels 12.1 and 12.2 and reconstruct the full VDR signal using methods similar to those depicted in FIG. 3. Note that the transport stream may include additional private data and flags to signal to the VDR decoder that channel 12.2 is a VDR enhancement channel.

As described earlier, to reduce drift, channels 12.1 and 12.2 may be created using VDR layer encoder similar to system 200 depicted in FIG. 2, wherein compression unit 240 and decompression units 230 are MPEG-2 encoders and decoders respectively, and the 8×8 IDCTs are computed by pre-determined fixed-precision operations to reduce drift on a ATSC decoder using similar fixed-precision operations. Similarly, a VDR layer decoder for channels 12.1 and 12.2 may be similar to system 300 depicted in FIG. 3, wherein SDR decoder is an MPEG-2 decoder and the 8×8 IDCT is computed using pre-determined fixed-precision approximations of the IDCT coefficients, identical or closely similar to those used by the corresponding encoder 450.

Private Data

Document A/53 Part 3, "ATSC Digital Television standard: Part 3—Service Multiplex and Transport System," 7 Aug. 2009, herein incorporated by reference, specifies multiple means by which an ATSC compliant bit stream can carry private data, including: Data Services, Private Program Elements, and Adaptation Fields. For example, "stream_type" codes in the range of 0xC4 to 0xFF are available for private stream types.

Figure 6:
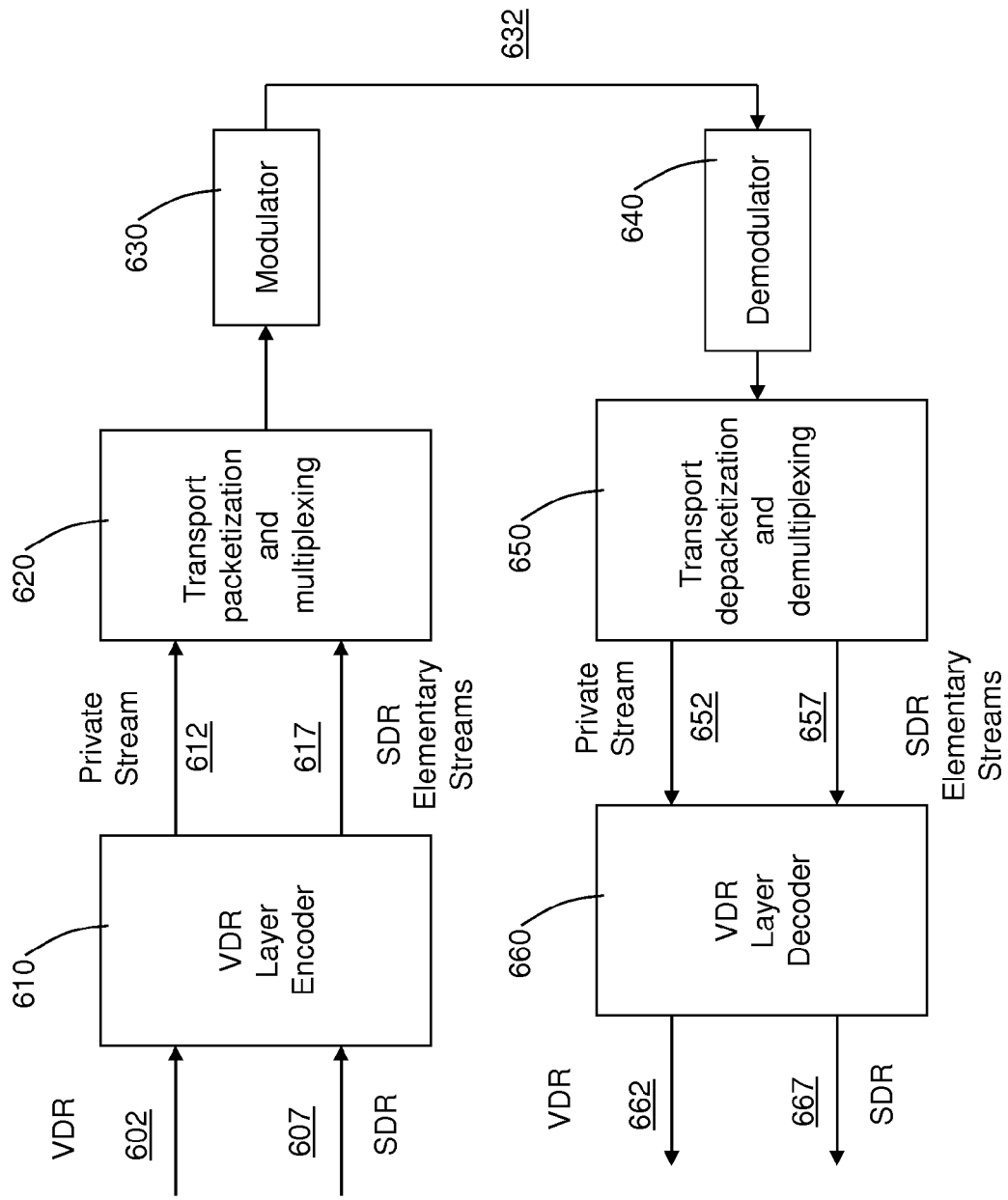
FIG. 6 depicts an example of a VDR ATSC-compatible system according to an embodiment of this invention.

FIG. 6 depicts an example of a backwards compatible VDR ATSC-like system, according to an embodiment of the present invention. Given input VDR (602) and SDR (607) streams, a VDR encoder 610 outputs ATSC compliant SDR elementary streams (e.g., audio and video streams) 617 and an enhancement stream 612, wherein the enhancement streams are packetized and multiplexed (620) as private stream data. VDR layer encoder 610 may be one similar to system 200 depicted in FIG. 2, wherein compression unit 240 and decompression units 230 are MPEG-2 encoders and decoders respectively, and the 8×8 IDCTs are computed by pre-determined fixed-precision operations to reduce drift. As described before, residual encoder 220 can be any appropriate video encoder with pre-defined fixed-precision transforms, such as an H.264 encoder.

On the receiver, after demodulation 640, transport depacketization and demultiplexing unit 650 may extract SDR elementary streams 657 and private stream data 652. A legacy SDR ATSC decoder will ignore the private stream data and decode only the SDR data. A VDR Layer Decoder 660 will decode both the SDR elementary streams and the private stream 652 and combine them to reconstruct either SDR stream 667 or VDR stream 662. In an example implementation, VDR decoder 660 may be similar to system 300 depicted in FIG. 3, wherein SDR decoder is an MPEG-2 decoder and the 8×8 IDCT is computed by a pre-determined fixed-precision operations, identical to those used by the corresponding encoder 610.

Example embodiments of this invention may also incorporate a mix of the methods described so far. In one example implementation, a VDR encoder using E-VSB data or a hidden channel to communicate the enhancement layer to a VDR decoder may also use private ATSC data to signal to the decoder metadata (255) and other ancillary information.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to VDR coding or decoding, such as those described herein. The computer and/or IC may compute any of a variety of parameters or values that relate to VDR coding and decoding as described herein. The image and video dynamic range extension embodiments may be implemented in hardware, software, firmware and various combinations thereof.

Embodiments of the present invention may be implemented with or comprise computer processors which execute software instructions which cause the processors to perform a method of the invention. For example, one or more processors in a display, an encoder, a set top box, a transcoder or the like may implement VDR coding and decoding methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to applying drift-free and backwards-compatible methods in coding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for coding of visual dynamic range (VDR) images, comprising:
receiving a VDR signal;
receiving a standard dynamic range (SDR) signal;
encoding the SDR signal as a coded base layer signal using a first encoder, wherein the first encoder comprises an MPEG-2 encoder;
encoding an enhancement layer signal using a second encoder, wherein the enhancement layer signal represents information with which the VDR signal may be reconstructed using the base layer signal and the enhancement layer signal;
wherein the first encoder encodes the SDR signal with a plurality of discrete transform coefficients with fixed precision, wherein said transform coefficients with fixed precision represent fixed-point approximations of transform coefficients that have an arbitrary precision;
encoding the base layer signal as a bitstream that complies with an Advanced Television Standards Committee (ATSC) specification;
encoding the enhancement layer signal as a bitstream that complies with an ATSC enhanced vestigial sideband (E-VSB) specification;
combining the ATSC encoded base layer bitstream and the ATSC E-VSB encoded enhancement bitstream into a combined ATSC/E-VSB signal stream; and
transmitting the combined ATSC/E-VSB stream.

2. The method of claim 1, wherein the second encoder comprises an H.264 encoder.

3. The method of claim 1 further comprising signaling the transform coefficients of fixed precision from the encoder to the decoder.

4. The method of claim 1 wherein the discrete transform coefficients comprise a plurality of inverse DCT (IDCT) coefficients.

5. The method as recited in claim 1, wherein the first encoder further encodes the SDR signal with a bit-exact transformation computation, which comprises a specific order of computations for computing an inverse DCT (IDCT) that is based on the fixed precision discrete transform coefficients.

6. A method for the coding of VDR images comprising:
receiving a VDR signal;
receiving an SDR signal;
encoding the SDR signal as a coded base layer signal using a first encoder, wherein the first encoder comprises an MPEG-2 encoder;
encoding an enhancement layer signal using a second encoder, wherein the enhancement layer signal represents information with which the VDR signal may be reconstructed using the base layer signal and the enhancement layer signal;
wherein the first encoder encodes the SDR signal with a plurality of discrete transform coefficients with fixed precision, wherein said transform coefficients with fixed precision represent fixed-point approximations of transform coefficients that have an arbitrary precision;
encoding and transmitting the base layer signal as a bitstream that complies with an Advanced Television Standards Committee (ATSC) specification; and
encoding and transmitting the enhancement layer signal as a coded hidden ATSC channel.

7. The method of claim 6, wherein the second encoder comprises an H.264 encoder.

8. The method of claim 6 further comprising signaling the transform coefficients of fixed precision from the encoder to the decoder.

9. The method of claim 6 wherein the discrete transform coefficients comprise a plurality of inverse DCT (IDCT) coefficients.

10. The method as recited in claim 6, wherein the first encoder further encodes the SDR signal with a bit-exact transformation computation, which comprises a specific order of computations for computing an inverse DCT (IDCT) that is based on the fixed precision discrete transform coefficients.

11. A method for the coding of VDR images comprising:
receiving a VDR signal;
receiving an SDR signal;
encoding the SDR signal as a coded base layer signal using a first encoder, wherein the first encoder comprises an MPEG-2 encoder;
encoding an enhancement layer signal using a second encoder, wherein the enhancement layer signal represents information with which the VDR signal may be reconstructed using the base layer signal and the enhancement layer signal;
wherein the first encoder encodes the SDR signal with a plurality of discrete transform coefficients with fixed precision, wherein said transform coefficients with fixed precision represent fixed-point approximations of transform coefficients that have an arbitrary precision;
encoding and transmitting the base layer signal as a bitstream that complies with an Advanced Television Standards Committee (ATSC) specification; and
encoding and transmitting the enhancement layer signal as a coded private ATSC data.

12. The method of claim 11, wherein the second encoder comprises an H.264 encoder.

13. The method of claim 11 further comprising signaling the transform coefficients of fixed precision from the encoder to the decoder.

14. The method of claim 11 wherein the discrete transform coefficients comprise a plurality of inverse DCT (IDCT) coefficients.

15. The method as recited in claim 11, wherein the first encoder further encodes the SDR signal with a bit-exact transformation computation, which comprises a specific order of computations for computing an inverse DCT (IDCT) that is based on the fixed precision discrete transform coefficients.

16. A method for decoding VDR signals comprising:
receiving ATSC signal comprising a normal ATSC data stream and an E-VSB data stream;
extracting a coded base layer signal from the normal data stream;
decoding the coded base layer signal using an MPEG-2 decoder;
reconstructing an SDR signal, wherein the MPEG-2 decoder decodes the base layer signal with a plurality of IDCT coefficients with fixed precision, wherein said coefficients with fixed precision represent fixed-point approximations of IDCT transform coefficients with arbitrary precision and match the IDCT transform coefficients that were used to encode the base layer signal;
extracting a coded enhancement layer signal from the E-VSB data stream;
decoding the enhancement layer signal using a second decoder; and,
combining the decoded enhancement layer signal with the reconstructed SDR signal to output a VDR signal.

17. The method as recited in claim 16, wherein the MPEG-2 decoder further decodes the base layer signal with a bit-exact transformation computation, which comprises a specific order of computations for computing an inverse DCT (IDCT) that is based on the fixed precision IDCT coefficients.

18. A method for decoding VDR signals comprising:
receiving an ATSC Transport stream comprising a non-hidden channel and a hidden channel;
extracting a coded base layer signal from the non-hidden channel;
decoding the coded base layer signal using an MPEG-2 decoder;
reconstructing an SDR signal, wherein the MPEG-2 decoder decodes the base layer signal with a plurality of IDCT coefficients with fixed precision, wherein said coefficients with fixed precision represent fixed-point approximations of IDCT transform coefficients with arbitrary precision and match the IDCT transform coefficients that were used to encode the base layer signal;
extracting a coded enhancement layer signal from the hidden channel;
decoding the enhancement layer signal using a second decoder; and,
combining the decoded enhancement layer signal with the reconstructed SDR signal to output a VDR signal.

19. The method as recited in claim 18, wherein the MPEG-2 decoder further decodes the base layer signal with a bit-exact transformation computation, which comprises a specific order of computations for computing an inverse DCT (IDCT) that is based on the fixed precision IDCT coefficients.

20. A method for decoding VDR signals comprising:
receiving an ATSC Transport stream comprising a normal ATSC data stream and a private data stream;
extracting a coded base layer signal from the normal data stream;
decoding the coded base layer signal using an MPEG-2 decoder;
reconstructing an SDR signal, wherein the MPEG-2 decoder decodes the base layer signal with a plurality of IDCT coefficients with fixed precision, wherein said coefficients with fixed precision represent fixed-point approximations of IDCT transform coefficients with arbitrary precision and match the IDCT transform coefficients that were used to encode the base layer signal;
extracting a coded enhancement layer signal from the private data stream;
decoding the enhancement layer signal using a second decoder; and,
combining the decoded enhancement layer signal with the reconstructed SDR signal to output a VDR signal.

21. The method as recited in claim 20, wherein the MPEG-2 decoder further decodes the base layer signal with a bit-exact transformation computation, which comprises a specific order of computations for computing an inverse DCT (IDCT) that is based on the fixed precision IDCT coefficients.

22. An apparatus comprising a processor and configured to preform the method recited in claim 1.

23. A non-transitory computer-readable storage medium having stored thereon non-transitory computer-executable instruction for executing a method in accordance with claim 1.

* * * * *